(No Model.)  N. G. WILLIAMS.  2 Sheets—Sheet 1.
FRUIT DRIER.
No. 323,008.  Patented July 28, 1885.
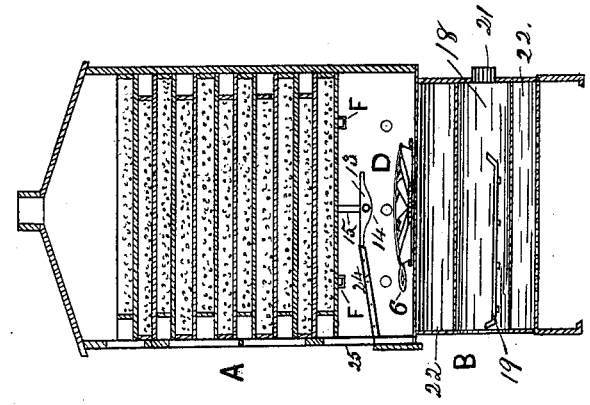
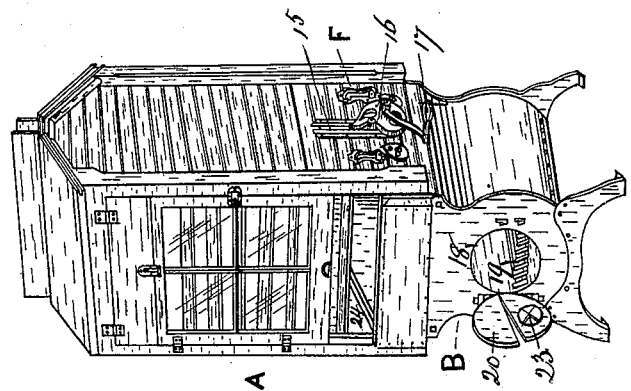
WITNESSES:  INVENTOR:

(No Model.) 2 Sheets—Sheet 2.

N. G. WILLIAMS.
FRUIT DRIER.

No. 323,008. Patented July 28, 1885.

WITNESSES: INVENTOR:
Nathan G. Williams

UNITED STATES PATENT OFFICE.

NATHAN G. WILLIAMS, OF BELLOWS FALLS, VERMONT, ASSIGNOR TO THE VERMONT FARM MACHINE COMPANY, OF SAME PLACE.

FRUIT-DRIER.

SPECIFICATION forming part of Letters Patent No. 323,008, dated July 28, 1885.

Application filed July 31, 1884. (No model.)

*To all whom it may concern:*

Be it known that I, NATHAN G. WILLIAMS, of Bellows Falls, in the county of Windham and State of Vermont, have invented certain new and useful Improvements in Apparatus for Drying Fruit and other Articles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvements are applicable to fruit-driers in general, but more especially to that class in which artificial heat is introduced at the bottom of the drying-chamber, and in which trays for holding the fruit or other articles to be dried are placed in such chamber prior to the drying, and removed therefrom with their dried contents when the drying has been sufficiently accomplished.

My invention relates to the construction and operation of the deflectors through which the heat is admitted to the drying-chamber, and to other features hereinafter stated.

Figure 3:
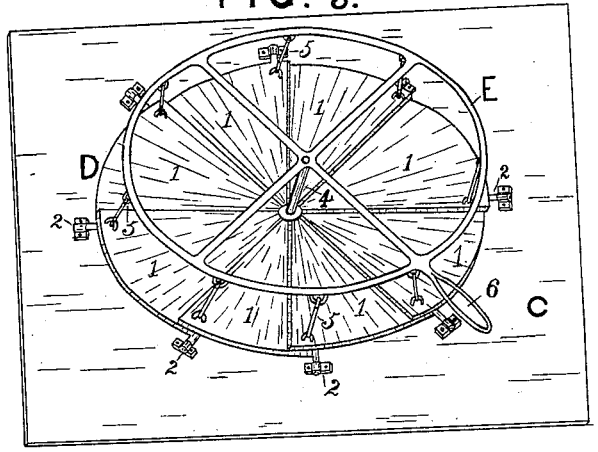
Figure 4:
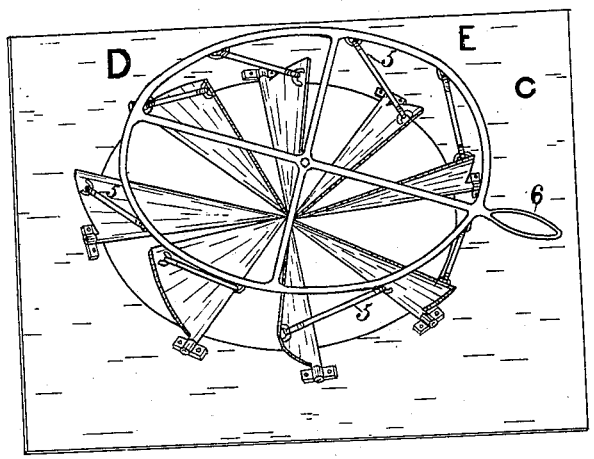
Figure 6:
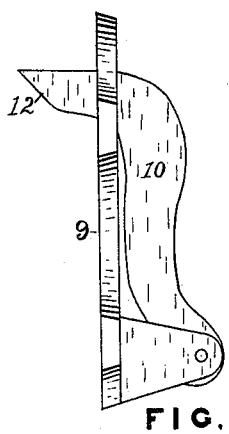
Figure 7:
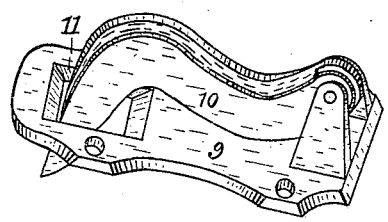
Figure 5:
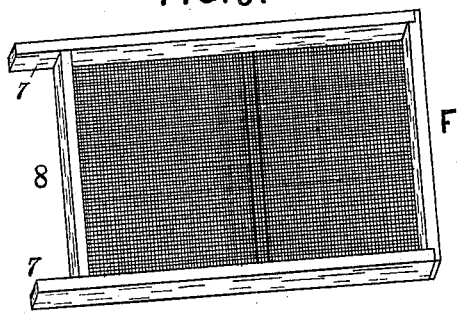

Figure 1 represents an elevation of a fruit-drier having my improvements embodied therein; Fig. 2, a vertical section of the same; Fig. 3, a perspective of my improved deflector detached, the wings being closed; Fig. 4, a perspective of the same deflector, the wings being open; Fig. 5, one of the trays detached; Figs. 6 and 7, different views, on an enlarged scale, of the gravitating latches or tray-supporters.

A indicates the drying box or case; B, the stove or heating-compartment beneath the same; C, a sheet-metal diaphragm or partition at the bottom of the drying chamber or case A, and between it and the stove, furnace, or heating-compartment B.

D is my deflector, one (or more) of which I place in the diaphragm C. This deflector is of metal, and preferably circular in form, and is composed of pieces shaped like sectors of a circle, so placed that when these pieces 1 are in the position as shown in Fig. 3 each shall slightly overlap the radial edge of the next adjacent one, thus closing up the opening in the diaphragm in or over which the deflector is placed. Each of these pieces, wings, or flaps is journaled or hinged so that it may be turned upon a shaft or support, 2, on the diaphragm C, and these shafts are also supported on the central standard, 4. This construction and arrangement permits each and all of these wings or flaps to be raised on their supports to any desired degree, and thereby to graduate or control the admission of hot air at will and as exigencies may demand; and it also permits the deflecting of this hot air in every direction within the drying-chamber, thus distributing it over all parts of the chamber.

For the purpose of opening, adjusting, or closing the wings or shutters of this deflector, I employ a ring, E, placed far enough above the deflector to allow the wings to be opened to the farthest distance which may be ever needed, this ring being centered on the standard to permit of its being turned thereon, and each wing is connected by a link, 5, to this ring, and a handle, 6, on the ring allows the attendant to turn it on its center, and thereby to open to any degree, and simultaneously, all the wings, and thereby, as will be evident, controlling completely the currents of heated air passing into the drier, as the condition of the drying fruit, vegetable, or other article may require. It will be seen that this construction compels the currents to flow in all directions, striking every part of the chamber, and thus having a great advantage over any system of parallel slats, like "blinds," which could admit the heat only in parallel straight currents or sheets; and it will be further seen that the adjustment by means of the handle, while not interfering with this flow in every direction, allows the operator to change the intensity or force of such flow and the inclination of the same upon entering the chamber.

The handle may be operated either from the inside of the chamber or it may extend through a slot in the side of the chamber and worked from the outside. In the latter case it is advisable to place a cap on the handle at the inside of the chamber to keep the slot covered and prevent the escape of heat through it.

The trays F are each formed with projections or arms 7 at one end, and which may be merely extensions of the sides of the tray-frame. The object of this is, that when placed in the drying-chamber, one upon another, and with the projections 7 of one tray, say, at the front of the chamber, and the projections of the next tray at the back of the chamber, and so on alternately for the whole series of trays employed, there shall not only be insured a long continuous and zigzag course of the heated air under and over each of the trays, but the position of these trays is secured against any accidental displacement of any or all of them in case of any handling or moving of the drier, inasmuch as the arms 7 positively preclude any possibility of any of the trays becoming shifted endwise, and therefore prevent any tray from covering the open space 8 left between the projections of its next adjacent tray. It will be evident that if these spaces were all directly over each other (as would be the case if the trays were all placed in the drying-chamber with their arms 7 at the same end of the chamber) the heated air would rise in a direct vertical column and escape and be lost without properly acting on the articles to be dried, and that if not provided with such arms any or all of them would be liable to get shifted from place, even during the drying operation, while working the elevator, or when introducing or removing a tray from the chamber. My construction and arrangement of trays are a positive and absolute security against all such damaging contingencies.

It will be understood that the trays are inserted at the bottom and removed from the top of the drying-chamber through appropriate openings or doors, and in a well-known manner, not needing to be described. The elevating devices which raise the trays from time to time for their removal consist of lifters 13 within the drying-case, and a pin, 14, thereon projecting through the case and into a guideway, 15, a cam-piece, 16, serving by its shape to leave the lifter at rest when lowered, to raise it gradually when the cam is turned by its crank or handle 17, and to sustain it, if need be, when raised.

The furnace consists of a fuel-chamber, 18, having a grate, 19, a door, 20, and a smoke-pipe, 21, and of a hot-air chamber, 22, surrounding this fuel-chamber.

The door may be made in two parts, one closing at a line above or near the top of the grate, and the other part closing or covering the remainder of the doorway, and provided with a register or adjustable air-inlet, 23.

Guide slats or ledges 24, secured to the inside of the drier-chamber, serve to facilitate the insertion of the trays and to guide them to their proper place relatively to the lifting devices. These ledges, preferably, incline upward, as shown, from the doorway or entrance 25.

The gravitating latches which support the trays are shown at F. Each of these consists of a plate, 9, adapted to be screwed to the outside of the drier at a suitable height above the diaphragm C, and hinged or pivoted upon ears thereon is the latch 10, whose upper end is bent in form and projects through a hole, 11, in the plate far enough to project also through an appropriate hole in the side of the drier, and to extend into the drying-chamber sufficiently to afford a rest on which the tray may be supported, this supporting-surface being preferably horizontal when the latch is in its normal position for supporting the tray. The fulcrum of this latch being on the outside of its plate, and the preponderance of its weight being toward the inside of the chamber, its normal position leaves it always ready to serve as a support, and this without the need of springs or any other auxiliary appliances. The under side of the inner end of these latches is made with an upward incline, 12, so that when the elevator lifts the trays the lowermost tray in rising shall ride or bear upon these inclines of the set (properly four) of latches just above it, and thus without being obstructed by the latches shall push them all outward until this tray shall have risen above those latches, and the latter, being thus set free, will by their own gravity swing inward at their upper ends, and resume their duty as supports for all trays above them.

It will be seen that there is nothing in these latch-castings to get out of order, and that they are strong and durable as well as cheaply made, and can be very easily applied to any existing drier.

The upper ring, E, on the deflector may be supported by the elevator-shaft, (not needing to be described,) instead of on the central standard or in combination with such shaft.

The furnace may be adapted for burning either wood or coal.

The drying-chamber is preferably made of wood with a zinc lining, and has an opening at its top to allow the air laden with moisture taken from the fruit to escape. This opening may be covered with a cap having a flue, which can be extended to any height or connected with the smoke-flue. The higher the flue is extended the greater will be the draft through the chamber and the faster the evaporation.

The trays have wooden frames with galvanized wire-cloth bottoms.

I claim—

1. In a fruit-drier, a deflector for admitting heat to the drying-chamber and for adjustably controlling and deflecting the same within such chamber, composed of a circular series of sector-like wings separately pivoted and adapted to be adjusted to different inclinations, and to open or close the heat-inlet passage to any desired degree and to distribute the heat, as set forth.

2. In a fruit-drier, in combination with a series of adjustable deflector-wings of sector-like form and severally arranged on bearings about a common center, a ring or wheel connected by links to each of the wings, and whereby they may all be simultaneously opened or closed to any desired extent, substantially as set forth.

NATHAN G. WILLIAMS.

Witnesses:
A. J. HOLLEY,
A. R. SLADER.